(12) United States Patent
Han et al.

(10) Patent No.: US 10,306,659 B2
(45) Date of Patent: May 28, 2019

(54) DATA TRANSMISSION METHOD AND DEVICE

(71) Applicant: Huawei Technologies Co., Ltd., Shenzhen, Guangdong (CN)

(72) Inventors: Guanglin Han, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 15/383,551

(22) Filed: Dec. 19, 2016

(65) Prior Publication Data

US 2017/0099674 A1   Apr. 6, 2017

Related U.S. Application Data

(63) Continuation of application No. PCT/CN2014/080426, filed on Jun. 20, 2014.

(51) Int. Cl.
*H04W 72/04* (2009.01)
*H04W 72/12* (2009.01)
*H04L 1/00* (2006.01)
*H04W 24/10* (2009.01)

(52) U.S. Cl.
CPC .......... *H04W 72/12* (2013.01); *H04L 1/0038* (2013.01); *H04L 1/0046* (2013.01); *H04L 1/0072* (2013.01); *H04W 24/10* (2013.01); *H04W 72/0406* (2013.01); *H04W 72/0446* (2013.01); *Y02D 70/00* (2018.01); *Y02D 70/1262* (2018.01)

(58) Field of Classification Search
CPC .......................... H04W 72/0406; H04W 72/04
See application file for complete search history.

(56) References Cited

U.S. PATENT DOCUMENTS

| | | | | |
|---|---|---|---|---|
| 9,055,577 B2 * | 6/2015 | Pan | ........................ | H04L 5/0007 |
| 9,173,214 B2 * | 10/2015 | Li | ........................... | H04L 5/001 |
| 2009/0088148 A1 | 4/2009 | Chung et al. | | |
| 2010/0113043 A1 * | 5/2010 | Hsuan | ................... | H04W 24/02 |
| | | | | 455/450 |
| 2010/0120442 A1 * | 5/2010 | Zhuang | ............. | H04B 7/15507 |
| | | | | 455/450 |

(Continued)

FOREIGN PATENT DOCUMENTS

CN    101699901 A    4/2010
CN    101714892 A    5/2010

(Continued)

*Primary Examiner* — Edan Orgad
*Assistant Examiner* — Emmanuel K Maglo

(57) ABSTRACT

The present invention relates to the communications field, and discloses a data transmission method and device, so as to resolve a problem of low efficiency and excessively much power consumption when user equipment performs blind detection on a scheduling control channel. A specific solution is: receiving, by a first device, scheduling control channel length information, performing, by the first device, blind detection in a preset search space according to the scheduling control channel length information, and after detecting a scheduling control channel corresponding to the scheduling control channel length information, obtaining, by the first device, resource allocation information carried on the scheduling control channel. The present invention is applied to data transmission.

10 Claims, 2 Drawing Sheets

(56) References Cited

U.S. PATENT DOCUMENTS

| | | | |
|---|---|---|---|
| 2010/0254329 A1* | 10/2010 | Pan | H04L 5/001 370/329 |
| 2010/0279628 A1* | 11/2010 | Love | H04L 5/003 455/70 |
| 2011/0103321 A1 | 5/2011 | Nishio et al. | |
| 2012/0054258 A1* | 3/2012 | Li | H04W 72/0406 709/201 |
| 2012/0082130 A1* | 4/2012 | Xue | H04L 5/001 370/330 |
| 2012/0093112 A1 | 4/2012 | Qu et al. | |
| 2012/0230266 A1* | 9/2012 | Xie | H04L 5/0053 370/329 |
| 2012/0307777 A1* | 12/2012 | Pan | H04W 74/006 370/329 |
| 2013/0128847 A1* | 5/2013 | Wang | H04L 1/0025 370/329 |
| 2013/0195275 A1* | 8/2013 | Koivisto | H04L 1/0061 380/287 |
| 2013/0265934 A1 | 10/2013 | Zeng et al. | |
| 2014/0133331 A1 | 5/2014 | Fu et al. | |
| 2014/0169313 A1 | 6/2014 | Yang et al. | |
| 2015/0131605 A1 | 5/2015 | Nogami et al. | |
| 2016/0112934 A1 | 4/2016 | Yamada et al. | |
| 2018/0084536 A1 | 3/2018 | Nishio et al. | |

FOREIGN PATENT DOCUMENTS

| | | |
|---|---|---|
| CN | 101772144 A | 7/2010 |
| CN | 101843155 A | 9/2010 |
| CN | 101883369 A | 11/2010 |
| CN | 103457688 A | 12/2013 |
| CN | 103812602 A | 5/2014 |
| JP | 2011114747 A | 6/2011 |
| JP | 2013533649 A | 8/2013 |
| JP | 2013243460 A | 12/2013 |
| WO | 2009057283 A1 | 5/2009 |
| WO | 2013140526 A1 | 9/2013 |
| WO | 2014087148 A1 | 6/2014 |

* cited by examiner

DATA TRANSMISSION METHOD AND DEVICE

CROSS-REFERENCE TO RELATED APPLICATIONS

This application is a continuation of International Application No. PCT/CN2014/080426, filed on Jun. 20, 2014, the disclosure of which is hereby incorporated reference in its entirety.

TECHNICAL FIELD

The present invention relates to the communications field, and in particular, to a data transmission method and device.

BACKGROUND

During downlink transmission of an LTE (Long Term Evolution) communications system, an eNB (evolved base station) generally performs data transmission in a unit of subframe, where a subframe length is 1 millisecond, and one subframe includes a physical downlink shared channel (PDSCH for short) region and a physical downlink control channel (PDCCH for short) region. The PDSCH is used to carry data sent by the eNB to user equipment, and the PDCCH is used to carry resource allocation information sent by the eNB to user equipment. To properly use a physical resource of the PDCCH region, the eNB divides the PDCCH region into different subregions, where each subregion is a search space.

The eNB sends the resource allocation information to the user equipment by using a PDCCH in the search space. To receive resource allocation information sent in the search space by the eNB, the user equipment performs blind detection on the PDCCH in the search space. If the user equipment detects the resource allocation information sent by the eNB to the user equipment, the user equipment receives the resource allocation information.

In the search space, one PDCCH carries one piece of resource allocation information, and because lengths of different resource allocation information are not completely the same, quantities of physical resource units occupied by different PDCCHs that carry different resource allocation information, that is, scheduling control channel lengths are also not completely the same. Therefore, when performing blind detection, the user equipment separately performs blind detection in the search space according to various possible scheduling control channel lengths, which causes low blind detection efficiency and excessively much power consumption of the user equipment.

SUMMARY

Embodiments of the present invention provide a data transmission method and device, so as to increase blind detection efficiency of user equipment and reduce power consumed by the user equipment due to blind detection.

To achieve the foregoing objective, the following technical solutions are used in the embodiments of the present invention:

According to a first aspect, a data transmission device includes:

a receiving unit, configured to receive scheduling control channel length information, where the scheduling control channel length information includes a quantity of physical resource units occupied by a scheduling control channel, and the scheduling control channel is a control channel used when resource allocation information is sent to the data transmission device; and a processing unit, configured to: perform blind detection in a preset search space according to the scheduling control channel length information received by the receiving unit, and after detecting the scheduling control channel corresponding to the scheduling control channel length information, obtain the resource allocation information carried on the scheduling control channel, where the preset search space is a search space used to carry the resource allocation information.

With reference to the first aspect, in a first possible implementation manner, the receiving unit is further configured to receive preset search space configuration information, where the preset search space configuration information includes location information of the preset search space, and the location information of the preset search space is used to indicate a time frequency resource occupied by the preset search space.

With reference to the first possible implementation manner of the first aspect, in a second possible implementation manner, the preset search space configuration information received by the receiving unit further includes: category information of the preset search space, where the category information of the preset search space is used to indicate a category of the preset search space, and the category of the preset search space includes: a public search space, a dedicated search space, or a group dedicated search space.

With reference to the first possible implementation manner of the first aspect, in a third possible implementation manner, when the preset search space configuration information received by the receiving unit further includes category information of the preset search space and the category information of the preset search space indicates that the preset search space is a group dedicated search space, the preset search space configuration information further includes identification information of a preset subframe, where the identification information of the preset subframe is used to indicate a subframe that carries the scheduling control channel; and the processing unit is further configured to perform, according to the identification information, received by the receiving unit, of the preset subframe, blind detection in the preset search space in the preset subframe according to the scheduling control channel length information.

With reference to any one of the first aspect to the third possible implementation manner of the first aspect, in a fourth possible implementation manner, the scheduling control channel length information received by the receiving unit is one of the following:

a quantity of channel control elements CCEs occupied by the scheduling control channel;

a quantity of subcarriers occupied by the scheduling control channel;

a quantity of physical symbols occupied by the scheduling control channel; or a scheduling control channel length corresponding to the scheduling control channel.

With reference to any one of the first aspect to the third possible implementation manner of the first aspect, in a fifth possible implementation manner, the processing unit is configured to: use, in the preset search space, k consecutive physical resource units as one scheduling control channel according to the quantity of physical resource units occupied by the scheduling control channel indicated by the scheduling control channel length information, and descramble, according to a preset descrambling identifier, the resource allocation information carried on the scheduling control channel in the preset search space, where the preset descrambling identifier is a descrambling identifier corresponding to scrambling processing performed on the resource allocation information, and k is the quantity of physical resource units occupied by the scheduling control channel; and if resource allocation information carried on an $i^{th}$ scheduling control channel in the preset search space is correctly descrambled, the resource allocation information is resource allocation information sent to a first device, and the $i^{th}$ scheduling control channel is the scheduling control channel, where i is an integer greater than 0.

According to a second aspect, a data transmission device includes:

a processing unit, configured to obtain scheduling control channel length information, where the scheduling control channel length information includes a quantity of physical resource units occupied by a scheduling control channel, and the scheduling control channel is a control channel used when resource allocation information is sent to a first device; and a sending unit, configured to send the scheduling control channel length information obtained by the processing unit, where the processing unit is configured to perform configuration on a length of the scheduling control channel according to the obtained scheduling control channel length information; and the sending unit is configured to send the scheduling control channel to the first device after the processing unit completes length configuration of the scheduling control channel.

With reference to the second aspect, in a first possible implementation manner, the sending unit is further configured to send preset search space configuration information, where the preset search space configuration information includes location information of a preset search space, and the location information of the preset search space is used to indicate a time frequency resource occupied by the preset search space.

With reference to the first possible implementation manner of the second aspect, in a second possible implementation manner, the preset search space configuration information sent by the sending unit further includes: category information of the preset search space, where the category information of the preset search space is used to indicate a category of the preset search space, and the category of the preset search space includes: a public search space, a dedicated search space, or a group dedicated search space.

With reference to any one of the second aspect to the second possible implementation manner of the second aspect, in a third possible implementation manner, the scheduling control channel length information obtained by the processing unit is one of the following:

a quantity of channel control elements CCEs occupied by the scheduling control channel;

a quantity of subcarriers occupied by the scheduling control channel;

a quantity of physical symbols occupied by the scheduling control channel; or a scheduling control channel length corresponding to the scheduling control channel.

According to a third aspect, a data transmission method includes:

receiving, by a first device, scheduling control channel length information, where the scheduling control channel length information includes a quantity of physical resource units occupied by a scheduling control channel, and the scheduling control channel is a control channel used when resource allocation information is sent to the first device;

performing, by the first device, blind detection in a preset search space according to the scheduling control channel length information; and after detecting the scheduling control channel corresponding to the scheduling control channel length information, obtaining, by the first device, the resource allocation information carried on the scheduling control channel, where the preset search space is a search space used to carry the resource allocation information.

With reference to the third aspect, in a first possible implementation manner, before the receiving, by a first device, scheduling control channel length info :nation, the method further includes:

receiving, by the first device, preset search space configuration information, where the preset search space configuration information includes location information of the preset search space, and the location information of the preset search space is used to indicate a time frequency resource occupied by the preset search space.

With reference to the first possible implementation manner of the third aspect, in a second possible implementation manner, the preset search space configuration information further includes: category information of the preset search space, where the category information of the preset search space is used to indicate a category of the preset search space, and the category of the preset search space includes: a public search space, a dedicated search space, or a group dedicated search space.

With reference to the first possible implementation manner of the third aspect, in a third possible implementation manner, when the preset search space configuration information received by the first device further includes category information of the preset search space and the category information of the preset search space indicates that the preset search space is a group dedicated search space, the preset search space configuration information further includes identification information of a preset subframe, where the identification information of the preset subframe is used to indicate a subframe that carries the scheduling control channel; and the performing, by the first device, blind detection in a preset search space according to the scheduling control channel length information includes:

performing, by the first device, according to the identification information of the preset subframe, blind detection in the preset search space in the preset subframe according to the scheduling control channel length information.

With reference to any one of the third aspect to the third possible implementation manner of the third aspect, in a fourth possible implementation manner, the scheduling control channel length information is one of the following:

a quantity of channel control elements CCEs occupied by the scheduling control channel;

a quantity of subcarriers occupied by the scheduling control channel;

a quantity of physical symbols occupied by the scheduling control channel; or a scheduling control channel length corresponding to the scheduling control channel.

With reference to any one of the third aspect to the third possible implementation manner of the third aspect, in a fifth possible implementation manner, the performing, by the first device, blind detection in a preset search space according to the scheduling control channel length information includes:

using, by the first device, in the preset search space, k consecutive physical resource units as one scheduling control channel according to the quantity of physical resource units occupied by the scheduling control channel indicated by the scheduling control channel length information, and descrambling, according to a preset descrambling identifier, the resource allocation information carried on the scheduling control channel in the preset search space, where the preset descrambling identifier is a descrambling identifier corresponding to scrambling processing performed on the resource allocation information, and k is the quantity of physical resource units occupied by the scheduling control channel; and if resource allocation information carried on an $i^{th}$ scheduling control channel in the preset search space is correctly descrambled by the first device, the resource allocation information is resource allocation information sent to the first device, and the $i^{th}$ scheduling control channel is the scheduling control channel, where i is an integer greater than 0.

According to a fourth aspect, a data transmission method includes:

sending, by a second device, scheduling control channel length information, where the scheduling control channel length information includes a quantity of physical resource units occupied by a scheduling control channel, and the scheduling control channel is a control channel used when resource allocation information is sent to a first device; and sending, by the second device, the scheduling control channel to the first device according to the scheduling control channel length information.

With reference to the fourth aspect, in a first possible implementation manner, before the sending, by a second device, scheduling control channel length information, the method further includes:

sending, by the second device, preset search space configuration information, where the preset search space configuration information includes location information of a preset search space, and the location information of the preset search space is used to indicate a time frequency resource occupied by the preset search space.

With reference to the first possible implementation manner of the fourth aspect, in a second possible implementation manner, the preset search space configuration information further includes: category information of the preset search space, where the category information of the preset search space is used to indicate a category of the preset search space, and the category of the preset search space includes: a public search space, a dedicated search space, or a group dedicated search space.

With reference to any one of the fourth aspect to the second possible implementation manner of the fourth aspect, in a third possible implementation manner, the scheduling control channel length information is one of the following:

a quantity of channel control elements CCEs occupied by the scheduling control channel;

a quantity of subcarriers occupied by the scheduling control channel;

a quantity of physical symbols occupied by the scheduling control channel; or a scheduling control channel length corresponding to the scheduling control channel.

According to the data transmission method and device provided in the embodiments of the present invention, a second device has first sent a scheduling control channel length to a first device, so that the first device only needs to perform blind detection in a preset search space according to the scheduling control channel length. Compared with the prior art, the first device can receive resource allocation information without needing to perform blind detection again in the preset search space according to another scheduling control channel length. Further, when the second device sends the resource allocation information to the first device by using a group dedicated search space, the second device sends a preset subframe identifier to the first device, so that the first device needs to perform blind detection only in a subframe indicated by the preset subframe identifier, and does not need to perform blind detection in each subframe. According to the blind detection method provided in the embodiments of the present invention, a quantity of times of blind detection performed by the first device is reduced, thereby increasing blind detection efficiency of the first device, and reducing power consumed by the first device due to blind detection.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
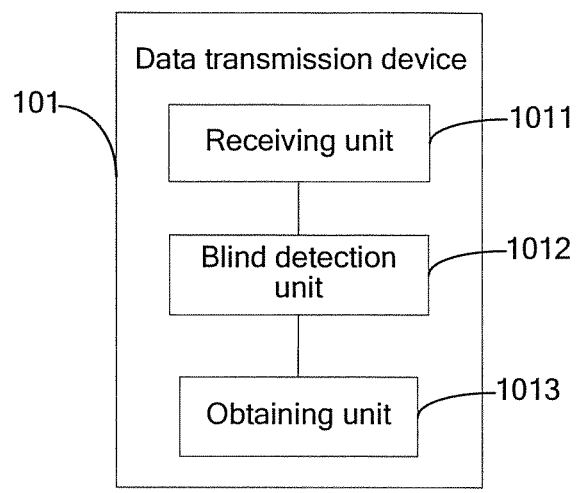
FIG. 1 is a schematic structural diagram of a data transmission device according to an embodiment of the present invention.

An embodiment of the present invention provides a data transmission device. Referring to FIG. 1, a device 101 includes a receiving unit 1011 and a processing unit 1012.

The receiving unit 1011 is configured to receive scheduling control channel length information, where the scheduling control channel length information includes a quantity of physical resource units occupied by a scheduling control channel, and the scheduling control channel is a control channel used when resource allocation information is sent to the data transmission device.

The processing unit 1012 is configured to: perform blind detection in a preset search space according to the scheduling control channel length information, and after detecting the scheduling control channel corresponding to the scheduling control channel length information, obtain the resource allocation information carried on the scheduling control channel, where the preset search space is a search space used to carry the resource allocation information.

According to the data transmission device provided in this embodiment of the present invention, information about a data transmission device length is received, resource allocation information can be received by performing blind detection in a preset search space according to the data transmission device length, and blind detection does not need to be performed again in the preset search space according to another data transmission device length. Therefore, a quantity of times of blind detection performed by the data transmission device is reduced, thereby increasing blind detection efficiency of the data transmission device, and reducing power consumed by the data transmission device due to blind detection.

Optionally, the receiving unit 1011 is further configured to receive preset search space configuration information, where the preset search space configuration information includes location information of the preset search space, and the location information of the preset search space is used to indicate a time frequency resource occupied by the preset search space.

Optionally, the preset search space configuration information received by the receiving unit 1011 further includes: category information of the preset search space, where the category information of the preset search space is used to indicate a category of the preset search space, and the category of the preset search space includes: a public search space, a dedicated search space, or a group dedicated search space.

Optionally, when the preset search space configuration information received by the receiving unit 1011 further includes category information of the preset search space and the category information of the preset search space indicates that the preset search space is a group dedicated search space, the preset search space configuration information further includes identification information of a preset subframe, where the identification information of the preset subframe is used to indicate a subframe that carries the scheduling control channel.

The processing unit 1012 is further configured to perform, according to the identification information, received by the receiving unit 1011, of the preset subframe, blind detection in the preset search space in the preset subframe according to the scheduling control channel length information.

Optionally, the scheduling control channel length information received by the receiving unit 1011 is one of the following:

a quantity of channel control elements CCEs occupied by the scheduling control channel;

a quantity of subcarriers occupied by the scheduling control channel;

a quantity of physical symbols occupied by the scheduling control channel; or a scheduling control channel length corresponding to the scheduling control channel.

Optionally, the processing unit 1012 is configured to: use, in the preset search space, k consecutive physical resource units as one scheduling control channel according to the quantity of physical resource units occupied by the scheduling control channel indicated by the scheduling control channel length information, and descramble, according to a preset descrambling identifier, the resource allocation information carried on the scheduling control channel in the preset search space, where the preset descrambling identifier is a descrambling identifier corresponding to scrambling processing performed on the resource allocation information, and k is the quantity of physical resource units occupied by the scheduling control channel; and if resource allocation information carried on an $i^{th}$ scheduling control channel in the preset search space is correctly descrambled, the resource allocation information is resource allocation information sent to the data transmission device, and the $i^{th}$ scheduling control channel is the scheduling control channel, where i is an integer greater than 0.

Correspondingly, a hardware device corresponding to the receiving unit in the embodiment shown in FIG. 1 may be a receiver, and a hardware device corresponding to the processing unit may be a processor.

According to the data transmission device provided in this embodiment of the present invention, scheduling control channel length information is received, resource allocation information can be received by performing blind detection in a preset search space according to a scheduling control channel length, and blind detection does not need to be performed again in the preset search space according to another scheduling control channel length. Therefore, a quantity of times of blind detection performed by the data transmission device is reduced, thereby increasing blind detection efficiency of the data transmission device, and reducing power consumed by the data transmission device due to blind detection.

Figure 2:
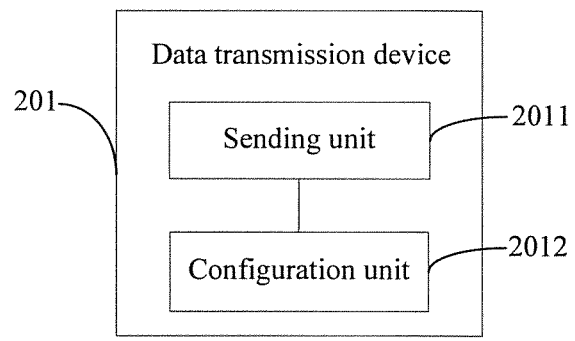
FIG. 2 is a schematic structural diagram of another data transmission device according to an embodiment of the present invention.

An embodiment of the present invention provides another data transmission device. Referring to FIG. 2, the device 201 includes a sending unit 2011 and a processing unit 2012.

The processing unit 2012 is configured to obtain scheduling control channel length information, where the scheduling control channel length information includes a quantity of physical resource units occupied by a scheduling control channel, and the scheduling control channel is a control channel used when resource allocation information is sent to a first device.

The sending unit 2011 is configured to send the scheduling control channel length information obtained by the processing unit.

The processing unit 2012 is configured to perform configuration on a length of the scheduling control channel according to the obtained scheduling control channel length information.

The sending unit 2011 is configured to send the scheduling control channel to the first device after the processing unit 2012 completes length configuration of the scheduling control channel.

According to the data transmission device provided in this embodiment of the present invention, scheduling control channel length information is sent to a first device, so that the first device can receive resource allocation information by performing blind detection in a preset search space according to a scheduling control channel length, without needing to perform blind detection again in the preset search space according to another scheduling control channel length. Therefore, a quantity of times of blind detection performed by the first device is reduced, thereby increasing blind detection efficiency of the first device, and reducing power consumed by the first device due to blind detection.

Optionally, the sending unit 2011 is further configured to send preset search space configuration information, where the preset search space configuration information includes location information of a preset search space, and the location information of the preset search space is used to indicate a time frequency resource occupied by the preset search space.

Optionally, the preset search space configuration information sent by the sending unit 2011 further includes: category information of the preset search space, where the category information of the preset search space is used to indicate a category of the preset search space, and the category of the preset search space includes: a public search space, a dedicated search space, or a group dedicated search space.

Optionally, the scheduling control channel length information obtained by the processing unit 2012 is one of the following:

a quantity of channel control elements CCEs occupied by the scheduling control channel;

a quantity of subcarriers occupied by the scheduling control channel;

a quantity of physical symbols occupied by the scheduling control channel; or a scheduling control channel length corresponding to the scheduling control channel.

Correspondingly, a hardware device corresponding to a sending unit in the embodiment shown in FIG. 2 may be a transmitter, and a hardware device corresponding to the processing unit may be a processor.

According to the data transmission device provided in this embodiment of the present invention, scheduling control channel length information is sent to a first device, so that the first device can receive resource allocation information by performing blind detection in a preset search space according to a scheduling control channel length, without needing to perform blind detection again in the preset search space according to another scheduling control channel length. Therefore, a quantity of times of blind detection performed by the first device is reduced, thereby increasing blind detection efficiency of the first device, and reducing power consumed by the first device due to blind detection.

Figure 3:
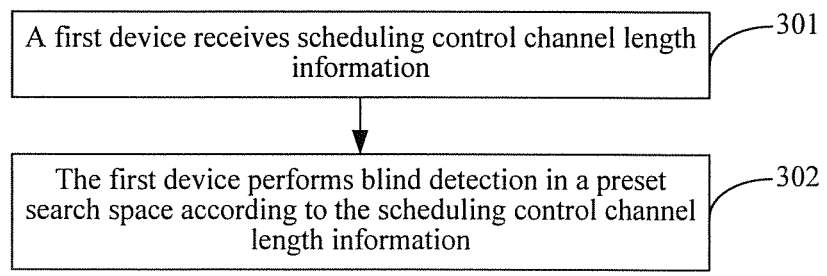
FIG. 3 is a schematic flowchart of a data transmission method according to an embodiment of the present invention.

An embodiment of the present invention provides a data transmission method, which is applied to the field of wireless communications. An LTE wireless communications system is used as an example herein for description; however, this does not mean that the method provided in this embodiment of the present invention is applicable only to an LTE wireless communications system. Referring to FIG. 3, the method includes the following steps:

301: A first device receives scheduling control channel length information.

The scheduling control channel length information includes a quantity of physical resource units occupied by a scheduling control channel, and the scheduling control channel is a control channel used when resource allocation information is sent to the first device In an application scenario, the first device is a mobile phone, and the first device may receive scheduling control channel length information sent by a base station. The scheduling control channel may be a physical downlink control channel (PDCCH, Physical downlink control channel) sent by a base station to the mobile phone, or may be a scheduling assignment (Scheduling assignment) sent by another mobile phone to the mobile phone. In this embodiment, a PDCCH is used as a scheduling control channel for exemplary description.

During downlink transmission of an LTE communications system, a base station generally performs data transmission in a unit of subframe, where one subframe includes multiple physical resource units in a time domain and a frequency domain, and these physical resource units are divided into two parts: a PDCCH region and a PDSCH region.

The PDCCH region may be further divided into different subregions, where each subregion is one search space, and different search spaces may be used to carry different types of resource allocation information. The base station may configure a location of a particular search space in the PDCCH region.

In an application scenario, when sending data to user equipment, the base station allocates a PDSCH to the user equipment to carry the data, and also allocates, in a search space, a PDCCH to the user equipment to carry resource allocation information. Optionally, the resource allocation information may include at least one of the following: first: information indicating a location of a resource used to transmit data, for example: a location index of a physical resource block corresponding to a resource occupied for transmitting data, or a location index of a physical resource block group corresponding to a resource occupied for transmitting data; second: information indicating a format of a resource used to transmit data, for example: a modulation and coding manner, BPSK (Binary Phase Shift Keying, binary phase shift keying), QPSK (Quadrature Phase Shift Keying, quadrature phase shift keying), 16 QAM (Quadrature Amplitude Modulation, quadrature amplitude modulation), or 64 QAM. The user equipment receives, according to the resource allocation information, data from the PDSCH allocated to the user equipment. Because lengths of different resource allocation information are not completely the same, quantities of physical resource units occupied by different PDCCHs that carry different resource allocation information are also not completely the same, and a quantity of physical resource units occupied by a PDCCH is referred to as a scheduling control channel length of the PDCCH.

In this embodiment, the first device receives scheduling control channel length information, and determines a scheduling control channel length according to the scheduling control channel length information. When the first device receives the resource allocation information sent by the base station, the first device uses the scheduling control channel length as a length of the PDCCH used when the base station sends the resource allocation information to the first device.

302: The first device performs blind detection in a preset search space according to the scheduling control channel length information.

Because the first device cannot determine whether the base station has sent, in the preset search space, the resource allocation information to the user equipment, when the base station has sent, in the preset search space, the resource allocation information to the user equipment, the first device also cannot determine a specific location of the resource allocation information in the preset search space. Therefore, the first device receives, in a manner of performing blind detection in the preset search space, the resource allocation information sent by the base station to the user equipment.

When sending the resource allocation information to the user equipment, the base station may mark the resource allocation information. If the first device detects the mark during blind detection, it means that the resource allocation information is the resource allocation information sent by the base station to the first device. Therefore, the first device receives data from a PDSCH indicated by the resource allocation information. If the first device does not detect the resource allocation information, the first device does not receive data.

In the prior art, a first device performs blind detection in a preset search space according to various possible scheduling control channel lengths. According to the blind detection method provided in this embodiment of the present invention, a base station has first sent a scheduling control channel length to a first device, so that the first device can receive resource allocation information by performing blind detection in a preset search space only according to the scheduling control channel length sent by the first device, without needing to perform blind detection again in the preset search space according to another scheduling control channel length. Therefore, a quantity of times of blind detection performed by the first device is reduced, thereby increasing blind detection efficiency of the first device, and reducing power consumed by the first device due to blind detection.

Figure 4:
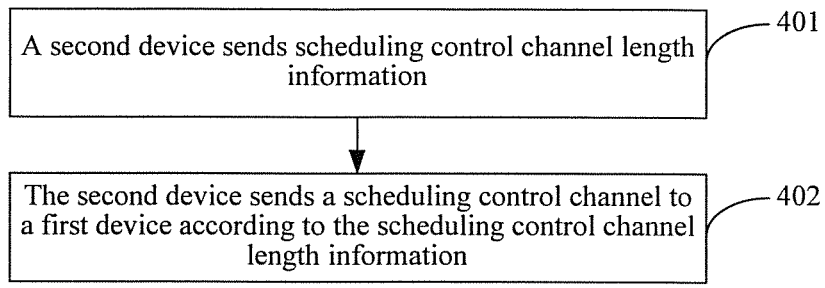
FIG. 4 is a schematic flowchart of another data transmission method according to an embodiment of the present invention.

An embodiment of the present invention provides another data transmission method. Referring to FIG. 4, the method includes the following steps:

401: A second device sends scheduling control channel length information.

The scheduling control channel length information includes a quantity of physical resource units occupied by a scheduling control channel, and the scheduling control channel is a control channel used when resource allocation information is sent to the first device.

In an application scenario, the second device is a base station, the first device is a mobile phone, and the scheduling control channel may be a PDCCH sent by the base station to the mobile phone, or may be a scheduling assignment sent by another mobile phone to the mobile phone. In this embodiment, a PDCCH is used as a scheduling control channel for exemplary description.

The second device delivers, to the first device by using the scheduling control channel length information, a PDCCH length needed for carrying resource allocation information, so that the first device determines a scheduling control channel length according to the scheduling control channel length information and performs blind detection in the preset search space.

402: The second device sends a scheduling control channel to a first device according to the scheduling control channel length information.

When sending the resource allocation information to the first device, the second device allocates a PDCCH to the first device according to the scheduling control channel length, that is, a length of the PDCCH is the scheduling control channel length.

According to the data transmission method provided in this embodiment of the present invention, a base station first sends a scheduling control channel length to a first device, and then sends resource allocation information to the first device, where a length of a PDCCH occupied by the resource allocation information is the scheduling control channel length. In this way, the first device only needs to perform, according to the scheduling control channel length, blind detection in a search space in which the scheduling control channel is located, without needing to perform, according to another scheduling control channel length, blind detection again in the search space in which the scheduling control channel is located. Therefore, a quantity of times of blind detection performed by the first device is reduced, thereby increasing blind detection efficiency of the first device, and reducing power consumed by the first device due to blind detection.

Figure 5:
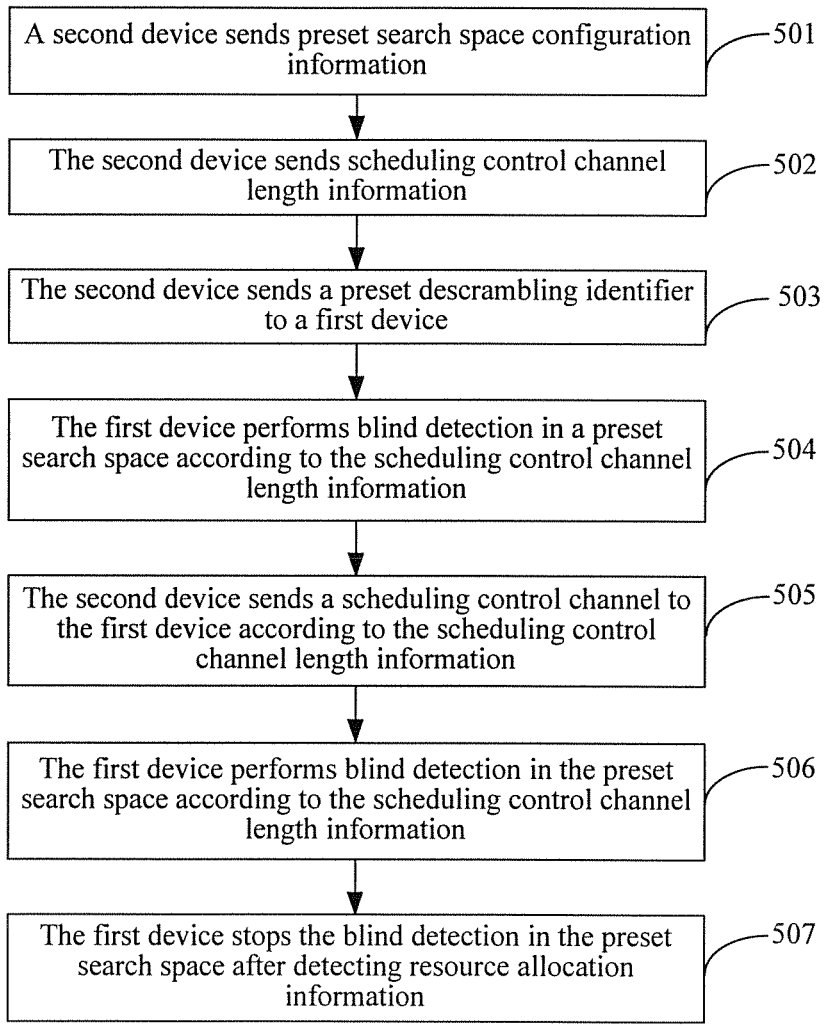
FIG. 5 is a schematic flowchart of still another data transmission method according to an embodiment of the present invention.

An embodiment of the present invention provides still another data transmission method, which is applied to an LTE wireless communications system. In this embodiment, a second device is an eNB, and a first device is a mobile phone. Referring to FIG. 5, the method includes the following steps:

501: The second device sends preset search space configuration information.

Optionally, the preset search space configuration information includes: location information of a preset search space, and category information of a preset search space. The location information of the preset search space is used to indicate a time frequency resource occupied by the preset search space, and the category information of the preset search space is used to indicate a category of the preset search space. Specifically optionally, the second device may be a base station.

A location of the preset search space is a location of the preset search space in a PDCCH region. The location information of the preset search space may be a frequency domain or time domain resource occupied by the preset search space, for example, a frequency domain bandwidth or a subcarrier occupied by the preset search space.

Optionally, the category of the preset search space may be a public search space, and resource allocation information sent by the second device in the public search space can be correctly received by user equipment in a cell. Further optionally, the second device uses downlink bandwidth information of the cell as location information of the preset search space and sends the location information to the user equipment.

Optionally, the category of the preset search space may be a dedicated search space, and each piece of resource allocation information in the dedicated search space can be correctly received only by particular user equipment. Further optionally, the second device uses a cell radio network temporary identifier as location information of the preset search space and sends the location information to the user equipment.

Optionally, the second device sends, by means of system broadcast or by using a dedicated message, the preset search space configuration information to user equipment in a region covered by the second device.

502: The second device sends scheduling control channel length information.

The scheduling control channel length information includes a quantity of physical resource units occupied by a scheduling control channel, and the scheduling control channel is a control channel used when resource allocation information is sent to the first device. The scheduling control channel may be a PDCCH sent by the second device to the first device, or may be a scheduling assignment sent by another terminal device except the first device to the second device. In this embodiment, a PDCCH is used as a scheduling control channel for exemplary description.

Because the physical resource unit may have multiple forms, corresponding PDCCH lengths also have multiple forms.

Optionally, the scheduling control channel length information may be any one of the following:

a quantity of CCEs (channel control element, Channel Control Element) occupied by the scheduling control channel;

a quantity of subcarriers occupied by the scheduling control channel;

a quantity of physical symbols occupied by the scheduling control channel; or a scheduling control channel length corresponding to the scheduling control channel.

A specific physical resource form is not limited in the present invention, and in this embodiment, only a channel control element is used as an example for description.

If a search space category indicated by the preset search space configuration information sent by the second device to the first device is a public search space, the second device may send the scheduling control channel length information to the first device by means of system broadcast.

If a search space category indicated by the preset search space configuration information sent by the second device to the first device is a dedicated search space, the second device may send the scheduling control channel length information to the mobile phone by using a dedicated message.

503. The second device sends a preset descrambling identifier to the first device.

The preset descrambling identifier is a descrambling identifier corresponding to scrambling processing performed on the resource allocation information by the second device.

A base station, that is, the second device allocates, in a preset search space, a PDCCH to user equipment, that is, the first device to carry resource allocation information, where the preset search space may include multiple PDCCHs to carry resource allocation information sent to different user equipment, that is, different first devices. Therefore, when sending the resource allocation information to target user equipment, that is, a target first device, the base station, that is, the second device marks the information, so that the target user equipment, that is, the target first device can correctly receive the resource allocation information, and non-target user equipment, that is, a non-target first device cannot correctly receive the resource allocation information.

Optionally, the second device performs scrambling processing on the resource allocation information, uses a corresponding descrambling identifier as a preset descrambling identifier and sends the preset descrambling identifier to the first device, and then sends the resource allocation information to the first device. In this way, the first device can perform, by using the preset descrambling identifier, descrambling processing on the resource allocation information on which scrambling processing has been performed, thereby correctly receiving the resource allocation information. Further optionally, the preset descrambling identifier sent to the first device maybe a radio network temporary identifier configured for the first device.

Optionally, in an application scenario, if a search space category indicated by the preset search space configuration information sent by the second device to the first device is a public search space, the resource allocation information may not be scrambled, or the resource allocation information is scrambled by using an unified scrambling identifier, and a corresponding descrambling identifier is used as the preset descrambling identifier and the preset descrambling identifier is sent to the first device by means of system broadcast.

Optionally, in an application scenario, if a search space category indicated by the preset search space configuration information sent by the second device to the first device is a dedicated search space, because resource allocation information in the dedicated search space is sent to a particular device, that is, the first device herein, the second device may send the preset descrambling identifier to the first device by using a dedicated message. When the second device sends, to the first device, the resource allocation information on which scrambling processing has been performed, because only the first device receives the preset descrambling identifier, only the first device can correctly descramble the resource allocation information.

Optionally, there is no order among steps 501, 502, and 503, and sending may be performed all at once or may be performed in multiple times. A specific sending manner is not limited in the present invention.

504: The first device performs blind detection in a preset search space according to the scheduling control channel length information.

Because the first device cannot determine whether the second device has sent, in the preset search space, the resource allocation information to the first device, when the second device has sent, in the preset search space, the resource allocation information to the first device, the first device also cannot determine a specific location of the resource allocation information in the preset search space. Therefore, if the first device detects the resource allocation information when performing blind detection in the preset search space, the first device receives data from a PDSCH indicated by the resource allocation information. If the first device does not detect a mark of the resource allocation information, the first device does not receive data.

A blind detection process is described herein by using an example.

Optionally, in an application scenario, the scheduling control channel length may be 1, 2, 4, or 8. Referring to Table 1, 16 channel control elements are allocated to five PDCCHs A, B, C, D, and E, which are corresponding to scheduling control channel lengths 4, 2, 1, 1, and 8 respectively. Certainly, only one channel control element allocation manner of a PDCCH is listed herein, and it does not mean that the present invention is only limited to this manner.

TABLE 1

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   |   | A |   |   | B |   | C | D |   |    |    | E  |    |    |    |

Each PDCCH on which the first device needs to perform blind detection is one candidate control channel (Candidate Control Channel). In the channel control element allocation manner shown in Table 1, if blind detection is performed according to a scheduling control channel length 4, the first device uses 0 to 3, 4 to 7, 8 to 11, and 12 to 15 as four candidate control channels to perform blind detection. If blind detection is performed according to a scheduling control channel length 8, the first device uses 0 to 7, and 8 to 15 as two candidate control channels to perform blind detection. A process of performing blind detection according to another scheduling control channel length is the same, and is not described again herein.

A process in which the first device performs blind detection in the preset search space is specifically:

Starting from an initial location of the preset search space indicated by the preset search space configuration information, the first device uses k consecutive physical resource units as one PDCCH, that is, one candidate control channel, according to the quantity of physical resource units occupied by the scheduling control channel indicated by the scheduling control channel length information, and descrambles, according to a preset descrambling identifier, resource allocation information carried on the candidate control channel, where k is the quantity of physical resource units occupied by the scheduling control channel, that is, a scheduling control channel length used when the second device sends the resource allocation information to the first device. If the descrambling fails, the k consecutive physical resource units after the candidate control channel are used as a next PDCCH on which blind detection is performed, and the rest may be deduced by analogy.

If the first device correctly descrambles resource allocation information carried on an $i^{th}$ PDCCH in the preset search space, the first device receives data from the PDSCH indicated by the resource allocation information.

If the second device has not sent the resource allocation information, the first device needs to perform blind detection on all candidate control channels in the search space.

Optionally, in an application scenario, a search space category indicated by search space configuration information sent by the second device to the first device is a public search space, a location of the public search space is the first 16 channel control elements in a PDCCH region, and a scheduling control channel length of a PDCCH in the public search space may be 4 or 8. With reference to Table 2, if the scheduling control channel length is 4, which is corresponding to four candidate control channels, and because each candidate control channel may carry two different valid payloads, blind detection needs to be performed on each candidate control channel twice, and a quantity of times of blind detection corresponding to the four candidate control channels is eight. If the scheduling control channel length is 8, which is corresponding to two candidate control channels, a quantity of times of blind detection is four. According to a blind detection method in the prior art, a first device needs to perform blind detection respectively according to two scheduling control channel lengths 4 and 8, and a quantity of times of blind detection is 12.

TABLE 2

| Scheduling control channel length | Quantity of candidate sets | Quantity of times of blind detection |
| --- | --- | --- |
| 4 | 4 | 8 |
| 8 | 2 | 4 |

Optionally, in an application scenario, a search space category indicated by search space configuration information sent by the second device to the first device is a dedicated search space, and a location of a first channel control element of the dedicated search space is obtained through calculation by using a hash function according to parameters such as a subframe number and a cell radio network temporary identifier. With reference to Table 3, a scheduling control channel length of a PDCCH in the dedicated search space may be 1, 2, 4, or 8, and a quantity of candidate control channels corresponding to each scheduling control channel length and a corresponding quantity of times of blind detection are shown in Table 3. According to the blind detection method provided in this embodiment of the present invention, the first device needs to perform blind detection only according to one of the scheduling control channel lengths, that is, 1, 2, 4 or 8, and a quantity of detection times is 12 or four. According to the blind detection method in the prior art, the first device performs blind detection according to each scheduling control channel length, where a quantity of times of blind detection is a sum of quantities of times of blind detection corresponding to all scheduling control channel lengths, that is, 32. As can be seen, according to the blind detection method provided in this embodiment of the present invention, a quantity of times of blind detection performed by the first device can be reduced, thereby increasing blind detection efficiency of the first device and reducing power consumed by the first device due to blind detection.

TABLE 3

| Scheduling control channel length | Quantity of candidate sets | Quantity of times of blind detection |
| --- | --- | --- |
| 1 | 6 | 12 |
| 2 | 6 | 12 |
| 4 | 2 | 4 |
| 8 | 2 | 4 |

505: The second device sends a scheduling control channel to the first device according to the scheduling control channel length information.

When sending the resource allocation information to the first device, the second device sends a PDCCH to the first device according to the scheduling control channel length, that is, a length of the PDCCH is the scheduling control channel length.

506: The first device performs blind detection in the preset search space according to the scheduling control channel length information.

The method for performing blind detection in step 506 is the same as that in step 504.

507: The first device stops the blind detection in the preset search space after detecting resource allocation information.

Optionally, for the first device, the preset search space includes only one piece of resource allocation information sent to the first device. Therefore, the first device stops the blind detection in the preset search space after correctly receiving, in the search space, the resource allocation information carried on a preset PDCCH.

The blind detection methods in step 504 and step 506 are the same, and the quantities of times of blind detection may be different. In step 504, because the second device has not sent, in the search space, the resource allocation information to the first device, the first device performs blind detection on all candidate control channels in the preset search space according to the scheduling control channel length. In step 506, because the second device has sent, in the search space, the resource allocation information to the first device, the first device can detect the resource allocation information, and stop the blind detection after detecting the resource allocation information. Therefore, the quantity of times of blind detection in step 504 is a maximum value of the quantity of times of blind detection in step 506.

According to the data transmission method provided in this embodiment of the present invention, a second device sends preset search space configuration information, the second device sends scheduling control channel length information, the second device sends a preset descrambling identifier to a first device, the first device performs blind detection in a preset search space according to the scheduling control channel length information, the second device sends a scheduling control channel to the first device according to the scheduling control channel length information, the first device performs blind detection in the preset search space according to the scheduling control channel length information, and the first device stops the blind detection in the preset search space when detecting resource allocation information, so that the first device needs to perform blind detection in the preset search space only according to the scheduling control channel length information sent by the second device, without needing to perform blind detection again in the preset search space according to another piece of possible scheduling control channel length information. Therefore, a quantity of times of blind detection performed by the first device is reduced, thereby increasing blind detection efficiency of the first device, and reducing power consumed by the first device due to blind detection.

An embodiment of the present invention provides yet another data transmission method. A second device is a base station, a first device is a mobile phone, and the base station sends resource allocation information to the mobile phone in a group manner, which can reduce a quantity of times of blind detection performed by the mobile phone, and increase use efficiency of a physical resource in a subframe. The method specifically includes the following steps:

601: The second device sends preset search space configuration information.

The preset search space configuration information includes location information of a preset search space, and the location information of the preset search space is used to indicate a time frequency resource occupied by the preset search space. A search space category indicated by the preset search space configuration information is a group dedicated search space, and each piece of resource allocation information in the group dedicated search space can be correctly received by only a mobile phone in a particular group. In this embodiment, the group dedicated search space is used as the preset search space.

The base station uses mobile phones as one group, uses, in the group dedicated search space, the group as a whole to allocate a PDCCH to the group, and sends resource allocation information through the channel. In this way, resource allocation information and data can be sent to a mobile phone in a group by occupying only one PDCCH and one PDSCH, thereby increasing use efficiency of a physical resource in a subframe.

Optionally, a range of the group dedicated search space in a PDCCH region may be configured according to an actual situation.

Optionally, location information of the group dedicated search space maybe a frequency domain resource range corresponding to the search space, for example, a frequency domain bandwidth or a subcarrier occupied by the group dedicated search space.

In an application scenario, configuration information of the group dedicated search space includes: a cell radio network temporary identifier of the group and location information of a candidate control channel of the group. Optionally, the location information of the candidate control channel of the group may be a location of a physical resource block in which the group dedicated search space is located. Specifically, the base station may send, to a mobile phone in the group, a physical resource block index of the physical resource block in which the group dedicated search space is located. Alternatively, the location information of the candidate control channel of the group may be an OFDM (Orthogonal Frequency Division Multiplexing, orthogonal frequency division multiplexing) symbol in which the group dedicated search space is located. Further, the location information of the candidate control channel of the group may further be an index of a preset PDCCH in the group dedicated search space. For example, if the group dedicated search space includes 10 PDCCHs, the index indicates that one of the 10 PDCCHs is used as a preset PDCCH, and the mobile phone directly performs, according to a scheduling control channel length, blind detection at the location indicated by the index.

Optionally, the configuration information of the group dedicated search space may further include a group service identifier, and the base station uses mobile phones that perform a same service as a group and send resource allocation information to the group. A specific group division manner is not limited in the present invention.

Optionally, the base station may send the configuration information of the group dedicated search space to the mobile phone in the group by using a dedicated message.

602: The second device sends scheduling control channel length information.

Optionally, to ensure that all mobile phones in the group can correctly receive resource allocation information carried on a preset PDCCH in the group, the base station may determine, according to a coverage area size of the group, a scheduling control channel length needed by the preset PDCCH in the group, that is, it is ensured that all mobile phones in a particular coverage area can correctly receive the resource allocation information carried on the preset PDCCH in the group. Specifically, a farther distance from the base station indicates a greater scheduling control channel length that is needed. Herein, if a scheduling control channel length needed by a mobile phone farthest from the base station is selected to be the scheduling control channel length, the resource allocation information can be sent to each mobile phone in the group by using the scheduling control channel length.

Optionally, the base station may determine a scheduling control channel length of the preset PDCCH in the group according to signal quality of the mobile phone in the group. Specifically, worse signal quality indicates a greater scheduling control channel length that is needed. Herein, if a scheduling control channel length needed by a mobile phone with the worst signal quality is selected to be the scheduling control channel length, the resource allocation information can be sent to each mobile phone in the group by using the scheduling control channel length. In this manner, the base station needs to estimate a signal quality status of the mobile phone in the group in advance, and for accurate estimation, the base station may instruct the mobile phone to report signal quality information.

Optionally, the scheduling control channel length may be one value selected from two or more possible values, and a specific figure may be selected according to an actual situation. In an application scenario, because of a location distribution or signal quality of a mobile phone or other reasons, scheduling control channel lengths needed by the base station to send resource allocation information to mobile phones in different groups are different. If only one scheduling control channel length is used, to enable different groups to correctly receive the resource allocation information, the scheduling control channel length needs to be a maximum value selected from multiple possible values, which may cause low use efficiency of a physical resource in a search space. Therefore, different scheduling control channel lengths are selected for different groups, which can increase use efficiency of the physical resource in the search space compared with using a single scheduling control channel length.

After determining the scheduling control channel length, the base station generates scheduling control channel length information, and sends the scheduling control channel length information to a mobile phone in a group.

603: The second device sends a preset descrambling identifier to the first device.

When sending resource allocation information to a mobile phone in a particular group, the base station performs scrambling processing on the resource allocation information. The base station sends the preset descrambling identifier to the mobile phone in the group in advance, so that the mobile phone in the group can correctly descramble the resource allocation information. Optionally, the preset descrambling identifier may be a cell radio network temporary identifier of the group.

Optionally, there is no order among step 601 to step 603, and sending may be performed all at once or may be performed in multiple times. A specific sending manner is not limited in the present invention.

604: The first device performs blind detection in a preset search space according to the scheduling control channel length information.

Specifically, the mobile phone performs blind detection at a location indicated by the configuration information of the group dedicated search space according to the scheduling control channel length.

605: The second device sends the scheduling control channel to the first device according to the scheduling control channel length information.

Optionally, in this embodiment, the preset search space configuration information received by the first device further includes category information of the preset search space and the category information of the preset search space indicates that the preset search space is a group dedicated search space, and the preset search space configuration information further includes identification information of a preset subframe, where the identification information of the preset subframe is used to indicate a subframe that carries the scheduling control channel. Specifically, time division multiplexing may be performed on a same frequency domain resource in different subframes, that is, the base station may use a PDCCH at a same location in different subframes as a preset PDCCH of different groups. For example, the base station uses five consecutive subframes as one cycle, and uses a PDCCH at a same location in a group dedicated search space in each subframe in the cycle as a preset PDCCH of five different groups. The base station sends, in a first subframe in the cycle, resource allocation information to a mobile phone in a first group, and sends, in a second subframe in the cycle, resource allocation information to a mobile phone in a second group, and the rest may be deduced by analogy. After the first cycle ends, the base station sends, in a second cycle, resource allocation information to the five groups sequentially. Therefore, the mobile phone in the first group needs to perform blind detection only in a first subframe in one cycle, without needing to perform blind detection in all the five subframes in the cycle. Likewise, mobile phones in the other four groups also need to perform blind detection in only one subframe in one cycle, without needing to perform blind detection in all the five subframes in the cycle. Optionally, a quantity of subframes included in each cycle may be configured according to an actual situation. In such a time division multiplexing manner for a same frequency domain resource, the mobile phone in the group does not need to perform blind detection in each subframe. Therefore, a quantity of times of blind detection performed by the mobile phone is reduced, thereby increasing blind detection efficiency of the mobile phone and reducing power consumed by the mobile phone due to blind detection.

606: The first device performs blind detection in the preset search space according to the scheduling control channel length information.

The method for performing blind detection in step 606 is the same as that in step 604.

607: The first device stops the blind detection in the preset search space after detecting resource allocation information.

Optionally, for one group, a group dedicated search space includes only one piece of resource allocation information sent to the group. Therefore, the mobile phone in the group stops the blind detection in the group dedicated search space after correctly receiving, in the search space, the resource allocation information carried on a preset PDCCH.

The blind detection methods in step 604 and step 606 are the same, and the quantities of times of blind detection may be different. In step 604, because the base station has not sent, in the group dedicated search space, the resource allocation information to the mobile phone, the mobile phone performs blind detection on all candidate control channels in the search space according to the scheduling control channel length. In step 606, because the base station has sent, in the search space, the resource allocation information to the mobile phone, a user can detect the resource allocation information, and stop the blind detection after detecting the resource allocation information. Therefore, the quantity of times of blind detection in step 604 is a maximum value of the quantity of times of blind detection in step 606.

According to a data transmission method provided in this embodiment of the present invention, a base station sends configuration information of a group dedicated search space to a mobile phone, and sends scheduling control channel length information and a preset descrambling identifier to a mobile phone in a group, and the base station performs time division multiplexing on a same frequency domain resource in different subframes, and sends, in the different subframes, resource allocation information to mobile phones in different groups, so that the mobile phone in the group does not need to perform blind detection in each subframe. Therefore, a quantity of times of blind detection performed by the mobile phone is reduced, thereby increasing blind detection efficiency of the mobile phone and reducing power consumed by the mobile phone due to blind detection, and also increasing use efficiency of a physical resource in a subframe.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM (Random Access Memory, random access memory), a ROM (Read-Only Memory, read-only memory), an EEPROM (Electrically Erasable Programmable Read-Only Memory, electrically erasable programmable read-only memory), a CD-ROM (Compact Disc Read-Only Memory, compact disc read-only memory) or other optical disc storage, a disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line, digital subscriber line) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk and disc used by the present invention includes a CD (Compact Disc, compact disc), a laser disc, an optical disc, a DVD (Digital Versatile Disc, digital versatile disc), a floppy disk and a Blue-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission device, comprising:
   a receiver, configured to receive scheduling control channel length information, wherein the scheduling control channel length information comprises a quantity of physical resource units occupied by a scheduling control channel, and the scheduling control channel is a control channel used when resource allocation information is sent to the data transmission device; and
   a processor, configured to:
   perform blind detection in a preset search space according to the scheduling control channel length information received by the receiver; and
   after detecting the scheduling control channel corresponding to the scheduling control channel length information, obtain the resource allocation information carried on the scheduling control channel, wherein the preset search space is a search space used to carry the resource allocation information
   wherein the receiver is further configured to:
   receive preset search space configuration information, wherein the preset search space configuration information comprises location information of the preset search space, and the location information of the preset search space is used to indicate a time frequency resource occupied by the preset search space;
   when the preset search space configuration information received by the receiver comprises category information of the preset search space and the category information of the preset search space indicates that the preset search space is a group dedicated search space, the preset search space configuration information further comprises:
   identification information of a preset subframe, wherein the identification information of the preset subframe is used to indicate a subframe that carries the scheduling control channel; and
   the processor is configured to perform, according to the identification information, received by the receiver, of the preset subframe, blind detection in the preset search space in the preset subframe according to the scheduling control channel length information.

2. A data transmission device, comprising:
   a processor, configured to prepare instructions for each first device in a group to report a respective signal quality information;
   a transmitter, configured to send the instructions to each first device to report the respective signal quality information;
   wherein the processor is further configured to:
   obtain the respective signal quality information reported by each first device in the group;
   estimate a signal quality status in the group according to the respective signal quality information; and
   determine a scheduling control channel length of a scheduling control channel in the group according to the respective signal quality status of the group; and
   obtain scheduling control channel length information according to the scheduling control channel length, wherein the scheduling control channel length information comprises a quantity of physical resource units occupied by the scheduling control channel, and the scheduling control channel is a control channel used when resource allocation information is sent to a first device;
   the transmitter is further configured to send the scheduling control channel length information obtained by the processor;
   the processor is configured to perform configuration on a length of the scheduling control channel according to the obtained scheduling control channel length information; and
   the transmitter is configured to send the scheduling control channel to at least one first device in the group after the processing unit completes length configuration of the scheduling control channel.

3. The device according to claim 2, wherein the transmitter is further configured to:
   send preset search space configuration information, wherein the preset search space configuration information comprises location information of a preset search space, and the location information of the preset search space is used to indicate a time frequency resource occupied by the preset search space.

4. The device according to claim 3, wherein the preset search space configuration information sent by the transmitter further comprises:
   category information of the preset search space, wherein the category information of the preset search space is used to indicate a category of the preset search space; and
   the category of the preset search space comprises:
   a public search space, a dedicated search space, or a group dedicated search space.

5. The device according to claim 2, wherein the scheduling control channel length information obtained by the processor is one of the following:
   a quantity of subcarriers occupied by the scheduling control channel;

a quantity of physical symbols occupied by the scheduling control channel; or a scheduling control channel length corresponding to the scheduling control channel.

6. A data transmission method, comprising:

receiving, by a first device, scheduling control channel length information, wherein the scheduling control channel length information comprises a quantity of physical resource units occupied by a scheduling control channel, and the scheduling control channel is a control channel used when resource allocation information is sent to the first device;

performing, by the first device, blind detection in a preset search space according to the scheduling control channel length information; and after detecting the scheduling control channel corresponding to the scheduling control channel length information, obtaining, by the first device, the resource allocation information carried on the scheduling control channel, wherein the preset search space is a search space used to carry the resource allocation information; and wherein before receiving, by the first device, the scheduling control channel length information, the method further comprises:

receiving, by the first device, preset search space configuration information, wherein the preset search space configuration information comprises location information of the preset search space, and the location information of the preset search space is used to indicate a time frequency resource occupied by the preset search space;

wherein when the preset search space configuration information received by the first device comprises category information of the preset search space and the category information of the preset search space indicates that the preset search space is a group dedicated search space, the preset search space configuration information further comprises:

identification information of a preset subframe, wherein the identification information of the preset subframe is used to indicate a subframe that carries the scheduling control channel; and performing, by the first device, blind detection in the preset search space according to the scheduling control channel length information comprises:

performing, by the first device, according to the identification information of the preset subframe, blind detection in the preset search space in the preset subframe according to the scheduling control channel length information.

7. A data transmission method, the method comprising:

instructing, by a second device, each first device in a group to report respective signal quality information;

obtaining, by the second device, the respective signal quality information reported by each first device in the group;

estimating, by the second device, a signal quality status in the group according to the respective signal quality information;

determining, by the second device, a scheduling control channel length of a scheduling control channel in the group according to the signal quality status in the group;

generating, by the second device, scheduling control channel length information after determining the scheduling control channel length;

sending, by a second device, scheduling control channel length information, wherein the scheduling control channel length information comprises a quantity of physical resource units occupied by the scheduling control channel, and the scheduling control channel is a control channel used when resource allocation information is sent to a first device; and sending, by the second device, the scheduling control channel to at least one first device in the group according to the scheduling control channel length information.

8. The method according to claim 7, wherein before sending, by the second device, the scheduling control channel length information, the method further comprises:

sending, by the second device, preset search space configuration information, wherein the preset search space configuration information comprises location information of a preset search space, and the location information of the preset search space is used to indicate a time frequency resource occupied by the preset search space.

9. The method according to claim 8, wherein the preset search space configuration information further comprises:

category information of the preset search space, wherein the category information of the preset search space is used to indicate a category of the preset search space; and the category of the preset search space comprises:

a public search space, a dedicated search space, or a group dedicated search space.

10. The method according to claim 7, wherein the scheduling control channel length information is one of the following:

a quantity of subcarriers occupied by the scheduling control channel;

a quantity of physical symbols occupied by the scheduling control channel; or a scheduling control channel length corresponding to the scheduling control channel.

* * * * *